(12) United States Patent
Pomorski (10) Patent No.: US 7,354,090 B1
(45) Date of Patent: Apr. 8, 2008

(54) SELF-SUPPORTING TAILGATE TABLE/EXTENSION

(76) Inventor: David Allen Pomorski, 116 - 11th St. South, Bradenton Beach, FL (US) 34217

( * ) Notice: Subject to any disclaimer, the term of this patent is extended or adjusted under 35 U.S.C. 154(b) by 0 days.

(21) Appl. No.: 11/437,932

(22) Filed: May 19, 2006

Related U.S. Application Data (60) Provisional application No. 60/683,665, filed on May 23, 2005.

(51) Int. Cl.
*B60P 3/34* (2006.01)
(52) U.S. Cl. .................................. 296/26.11; 296/57.1
(58) Field of Classification Search ............ 296/26.11, 296/26.1, 57.1, 50, 26.01, 26.08, 61, 37.6, 296/180.1
See application file for complete search history.

(56) References Cited

U.S. PATENT DOCUMENTS

| | | | | |
|---|---|---|---|---|
| 2,405,054 A * | 7/1946 | Pringle | .......................... | 296/62 |
| 3,474,921 A * | 10/1969 | Rossoni | ........................ | 414/557 |
| 3,498,481 A * | 3/1970 | Size | ............................. | 414/558 |
| 4,007,844 A * | 2/1977 | Perkins | ......................... | 414/557 |
| 4,078,676 A * | 3/1978 | Mortenson | ................... | 414/558 |
| 4,344,508 A * | 8/1982 | Peck | .......................... | 414/557 |
| 4,806,062 A * | 2/1989 | Stier | ............................ | 414/545 |
| 4,813,842 A * | 3/1989 | Morton | ....................... | 296/57.1 |
| 4,836,736 A * | 6/1989 | Neagu | .......................... | 414/558 |
| 4,930,973 A * | 6/1990 | Robinson | ..................... | 414/557 |
| 4,993,908 A * | 2/1991 | Park | ............................. | 296/51 |
| 5,171,123 A * | 12/1992 | Nuyts et al. | ................. | 414/540 |
| 5,284,414 A * | 2/1994 | Kempf | ......................... | 414/545 |
| 5,328,225 A * | 7/1994 | Melching et al. | ......... | 296/26.11 |
| 5,468,038 A * | 11/1995 | Sauri | ........................ | 296/26.11 |
| 5,478,130 A * | 12/1995 | Matulin et al. | ............. | 296/57.1 |
| 5,649,731 A | 7/1997 | Tognetti | | |
| 5,826,932 A * | 10/1998 | DeSimone | ................ | 296/26.11 |
| 5,857,724 A * | 1/1999 | Jarman | ..................... | 296/26.11 |
| 5,918,925 A * | 7/1999 | Perrin | ....................... | 296/26.11 |
| 5,975,610 A * | 11/1999 | Tracy | ......................... | 296/57.1 |
| 6,082,801 A * | 7/2000 | Owen et al. | ............. | 296/26.11 |
| 6,193,294 B1 | 2/2001 | Disner et al. | | |
| 6,206,445 B1 * | 3/2001 | Brooks | ....................... | 296/57.1 |
| 6,340,190 B1 * | 1/2002 | Rosebrugh et al. | ...... | 296/26.11 |
| 6,378,926 B1 * | 4/2002 | Renze et al. | ............. | 296/26.11 |
| 6,742,822 B2 * | 6/2004 | Vejnar | ....................... | 296/26.11 |
| 6,779,824 B1 * | 8/2004 | Lazarevich et al. | ........ | 296/37.6 |
| 6,824,186 B2 * | 11/2004 | Brown | ..................... | 296/65.16 |
| 6,991,277 B1 * | 1/2006 | Esler | ............................ | 296/50 |
| 7,111,885 B1 * | 9/2006 | Hoffmann et al. | ........ | 296/26.11 |
| 7,201,424 B1 * | 4/2007 | Fournier | ..................... | 296/57.1 |
| 2002/0000732 A1 * | 1/2002 | Sanders | ................... | 296/26.08 |

* cited by examiner

*Primary Examiner*—Kiran B. Patel
(74) *Attorney, Agent, or Firm*—Dorothy S. Morse (57) ABSTRACT

A tailgate adaptation for motor vehicles, preferably pick-up trucks, with at least two flat panels that are constructed of aluminum, molded fiberglass, plastic, or other suitable materials, and which convert an ordinary tailgate into a surface that provides a number of useful purposes, including but not limited to, work bench, picnic table, and bed extension. It is completely self-supporting and mounted on the tailgate using simple hand tools. In the closed position it uses a minimum of the available truck box space. In the open position it provides a large flat surface with a small number of moving parts. Because of its self-supporting design element, any dependency on mechanical supports, such as attached legs or braces, positioned between the panels and the ground or other surface supporting the motor vehicle is eliminated. This versatile tailgate adaptation device can be installed during truck manufacture or utilized in after market applications.

12 Claims, 8 Drawing Sheets

SELF-SUPPORTING TAILGATE TABLE/EXTENSION

CROSS REFERENCES TO RELATED APPLICATIONS

The applicant claims priority herein for the U.S. Provisional Patent application having a serial number of U.S. 60/683,665 and a title of "Foldout self supporting tailgate table/extension", which was filed by the same inventor on May 23, 2005 for substantially the same subject matter.

BACKGROUND

1. Field of the Invention

This invention is designed for vehicles having a pivoting tailgate that can be lowered into a horizontally-extending open position from a vertically-extending closed position. It relates to a simple device with hinged panels that, when attached to the tailgate of a motor vehicle, provides an extended surface that can be used in multiple orientations for a variety of differing applications, including but not limited to use as a horizontally-extending table surface, a horizontally-extending extension of a pick-up truck bed that can be used for load-bearing purposes, a vertically-extending surface that functions as a tailgate but is positioned approximately eighteen inches beyond where the original tailgate would be if raised into its closed position, a horizontally-extending surface that can be used for the attachment of signs, flags, and other objects intended for display, a bench seat, and other support purposes. The offset positioning of its hinge back from the rear edge of the open tailgate gives the present invention device its strength when used as a load-bearing surface.

2. Description of the Related Art

Now that "light truck" models, including pick-up trucks, are poised to overtake car sales in most states, it is evident that many households are using them as their primary vehicles. They have become mainstream at all sporting events, national parks, and job sites all over the world. The availability of extra surface area to use as a table or other support purpose is always a plus in these situations, whether it is used as a work bench to support equipment needed on a job or as a table on which to place food and other refreshments. The rise in popularity of "Tailgate Parties" as well as the desire for off road activities, such as kayaking and canoeing, makes a product such as the simple, convenient, and self-supporting tailgate table/extension of the present invention, a viable offshoot to enhance the practicality of pickup trucks, sport/utility vehicles, and other vehicles having a tailgate suitable for its attachment. Thus, there presently exists a need for a device that is unobtrusive when stowed, easy to move between its usable and stored positions, as well as practical and efficient when used in both work and recreational applications.

There have been many approaches by inventors to the design of tailgate improvements and accessories. U.S. Pat. No. 5,649,731 to Tognetti (July, 1997), discloses a device that is usable as a table rather than an extension feature. The Tognetti workbench is on vehicle mounted tracks secured to the floor of the cargo compartment. Its mechanism has two rails extending along the length of the truckbed and a rigid plate member forming a work bench positioned above the first and second rails. There are also a plurality of rollers secured to the rigid plate member whereby the rigid plate member and the attached rollers can be rolled in and out of the cargo compartment. During use of the Tognetti invention as a workbench, the tailgate is attached by a hinged means to the rigid plate member and serves as the distal end of the surface. Ground support for the apparatus is provided by pivoting, telescoping legs. While the Tognetti device affords a sizable addition to the working surface of a pickup truck, it is distinguished from the present invention as it requires numerous modifications of the truck bed and tailgate with which it is used. In contrast, the present invention is simple and when the pre-drilled holes of modern truck beds are used, prior to installation of the present invention no modification of the truck is required.

Another approach to tailgate adaptation, and which combines the features of a tailgate extension and a work surface, is illustrated in U.S. Pat. No. 6,193,294 to Disner (February 2001). The Disner device mounts on the tailgate of a pickup with a hinging means that is enabled as a work surface only through the engagement of removable legs. This means of attachment also creates a permanent mounting disfigurement to the truck in which it is installed. The device has a central panel and two end panels each having means for attachment on opposed sides of the central panel, which together function to provide enlargement of the cargo area of a truck bed by enclosing the truck's tailgate in the down position. The side panels of the Disner invention can be rotated into a stowed position on top of the central panel. Thus, the Disner invention is distinguishable in many respects from the simpler structure of the present invention.

Although a number of prior art inventions appear similar in function to the present invention device, on closer scrutiny it is evident that they all require a greater number of moving parts to function effectively. Therefore an important difference between these tailgate adaptations and the present invention device is that the present invention device is so much simpler to make and use, and so much more versatile in its applications. Thus, there still remains a need for a simple mechanism that can be attached to the tailgate of a truck, and which will enhance the tailgate's functionality and support capacity with little or no modification to the truck and without the use of support legs or braces.

BRIEF SUMMARY OF THE INVENTION

It is the primary object of this invention to provide a rigid and substantially planar surface extension at the distal/top end of the tailgate of a motor vehicle, particularly pickup trucks, that can be compactly stored when not in use adjacent to the upright or lowered tailgate, and then unfolded into a substantially horizontally-extending position beyond the top/distal end of the lowered tailgate for use as a support surface that expands the usable area of the truck bed without the use of any mechanical structure under the extension for ground support. A further object of this invention is to provide a self-supporting table-like truck bed extension that is helpful in both work and recreational load-bearing applications. It also is a further object of this invention to provide a metal bi-fold bracket adapted to lock the distal tapered panel of the present invention into a 90 degree angle relative to the truck bed surface to mimic the structure and function of a tailgate and extend the truck bed by approximately eighteen inches. A further object of this invention is to provide a self-supporting table-like truck bed extension that can be converted into a bench seat. It is a further object of this invention to provide at least two panels that fold flat against the tailgate of a pickup for compact storage when the tailgate is placed into its fully stored and vertically-extending configuration, that compromises little space in a truck bed to maximize the truck bed's load carrying capacity, has durable construction, is made from weather resistant materials, requires little refurbishment between uses, and is cost effective to make and use.

The present invention is designed with the utmost simplicity in mind. For use as a workbench, the present invention can be attached to the standard pickup tailgate on older model pick-up trucks with as few as six stainless steel screws, or it can be attached to newer model trucks with well nuts to the pre-drilled holes provided by the manufacturer. The present invention has at least two panels pivotally joined together, preferably with one long piano hinge although other hinging means can also be used, which when the tailgate is up are oriented in a substantially vertically-extending position flat against the vertical tailgate. This allows for a minimum of obstructed space in the truck bed itself and expands its load carrying capacity. When the tailgate is down and the distal tapered panel of the present invention is extended into a substantially horizontally-extending position, and it is fully supported by an extruded right angle support system, which has been successfully tested to hold at least 400 lbs. of supported weight. Thus, legs or braces, and/or any other form of additional mechanical support between the distal tapered panel of the present invention and the ground or other surface supporting the truck to which it is attached, are not needed for support of the distal tapered panel during its use. Also, the present invention lends itself perfectly for use of the distal tapered panel in a horizontally-extending position as an extended table surface, and is perfect for tailgate parties before a big sporting event. In the alternative, distal tapered panel can be repositioned to serve as a bench seat. However, in addition the present invention also has camping applications and can be used on-the-job as a work bench, as well as in other supportive applications. Left in a horizontally-extending position, the distal tapered panel also serves as an extension of the supporting top surface of the truck tailgate, which in combination with the tailgate is perfect for hauling long pieces of lumber, kayaks, canoes, and/or other loads having an elongated length dimension. A metal bi-fold bracket attached between the distal end of the present invention table/extension and the sides of the pickup bed can also be used to place the distal tapered panel into a vertically-extending position, where it mimics the truck's real tailgate in an extended location approximately eighteen inches from the back end of the truck.

The description herein provides preferred embodiments of the present invention but should not be construed as limiting its scope. For example, variations in the number of positions in which the distal tapered panel can be used in differing applications; whether the panels would be connected in a manner that allows them to be easily replaceable; the angle at which the distal tapered panel is positioned during its extension; the surface and perimeter configurations of the panels used; the rigidity of the panels used; the optional use of one or more accessories with the panels; and the means by which the panels are attached to the tailgate, other than those shown and described herein, may be incorporated into the present invention. Thus the scope of the present invention should be determined by the appended claims and their legal equivalents, rather that being limited to the examples given.

DETAILED DESCRIPTIONS OF PREFERRED EMBODIMENT

The self-supporting tailgate table/extension of the present invention will be described below and otherwise herein through the disclosure of several preferred embodiments. However, it is to be understood that the present invention is not limited only to the embodiments specifically mentioned herein and it is also contemplated for alternative embodiments to have modifications that arise in the engineering of the disclosed and claimed invention. Therefore, one must look to the claims section herein for the defining language of the present invention and use the following descriptions only as examples for the benefit of understanding the invention.

Figure 1:
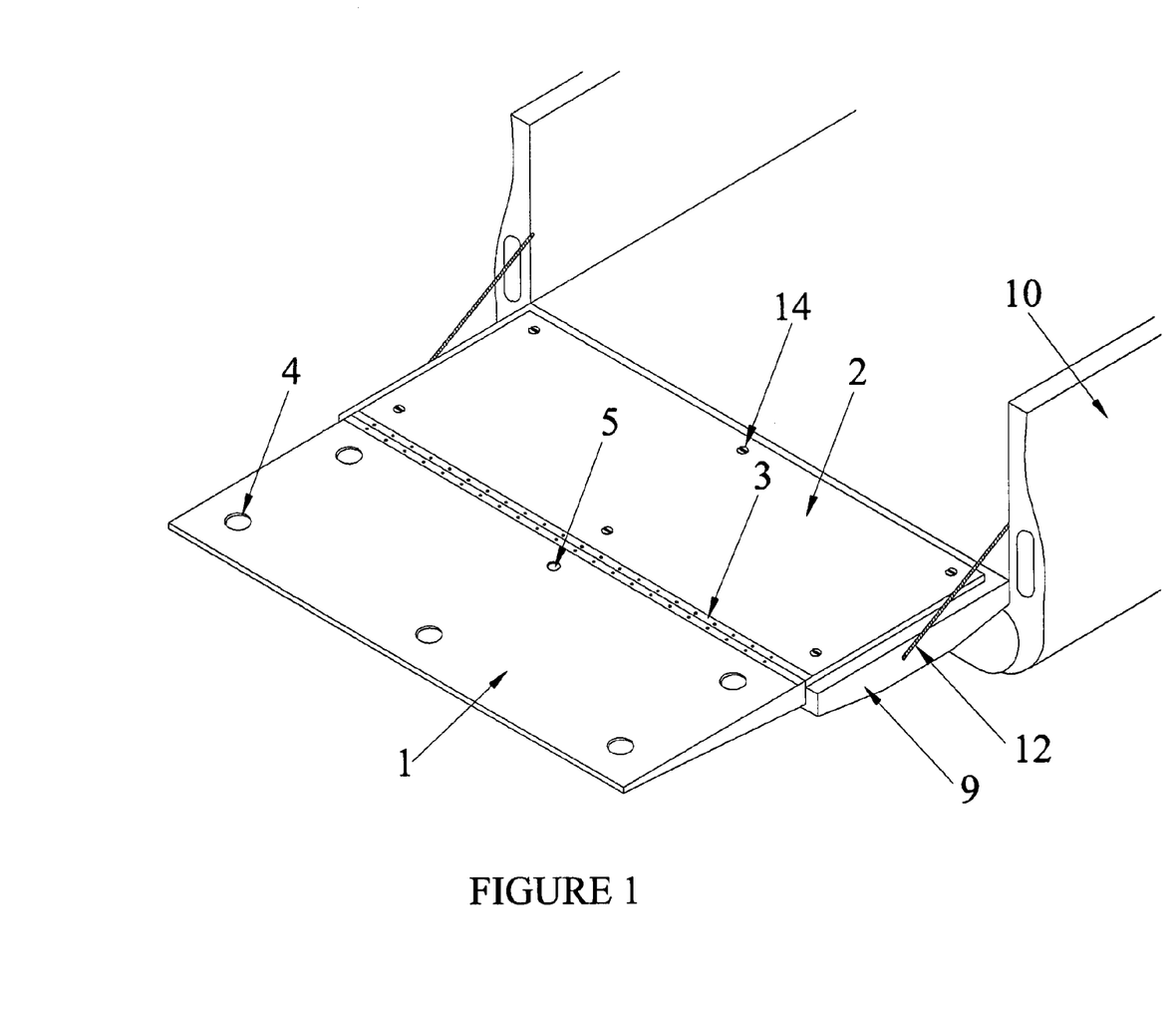
FIG. 1 is a top plan view of a first preferred embodiment of the present invention used as a tailgate table for recreational purposes.
Figure 8:
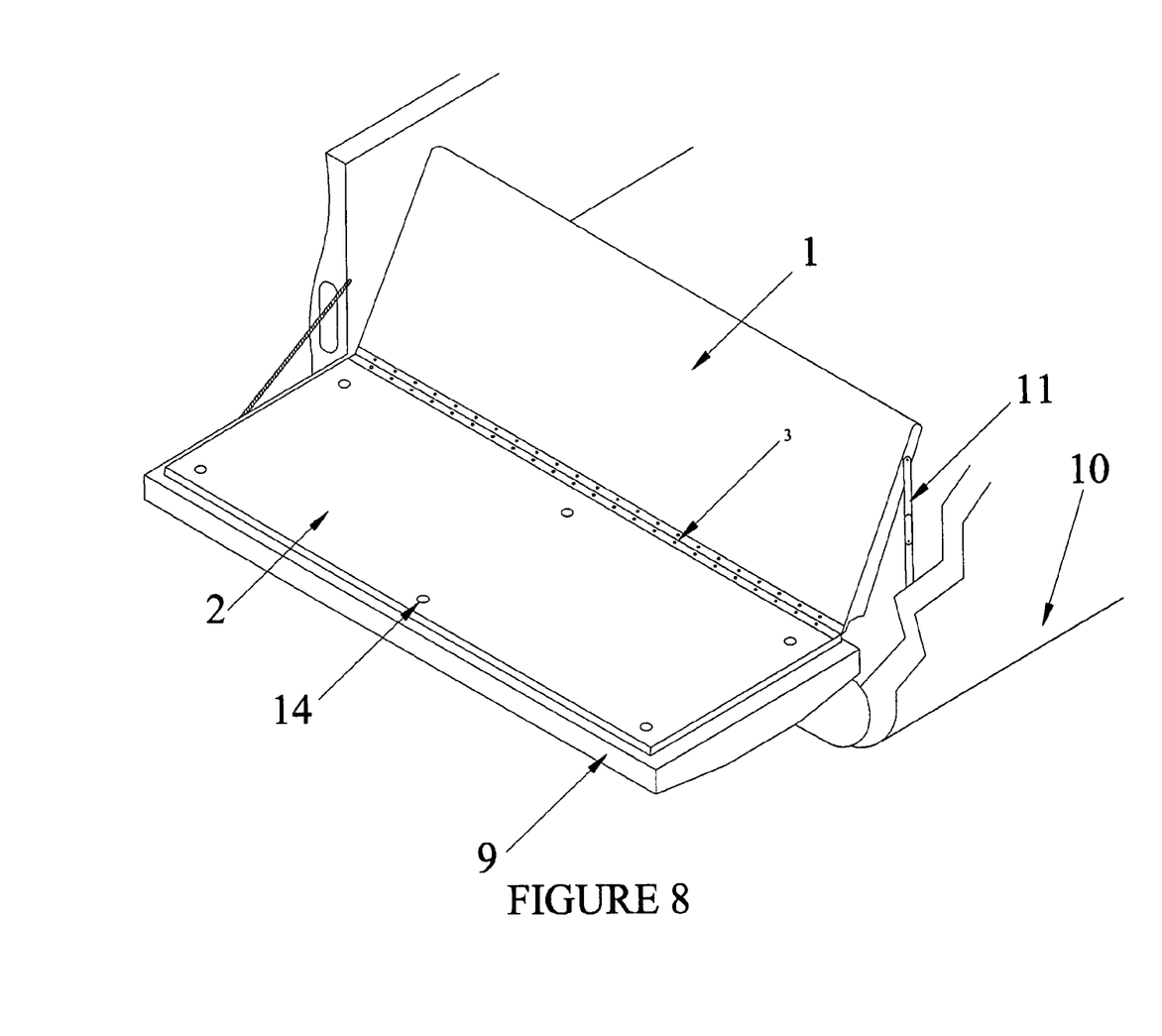
FIG. 8 is a top plan view of the third preferred embodiment of the present invention rotated 180 degrees relative to the tailgate and now serving as a bench seat.

FIG. 1 shows a first preferred embodiment of the present invention self-supporting table/extension connected to the pivoting tailgate 9 of a pick-up truck 10 and having a distal tapered panel 1 and a proximal panel 2. Although a pick-up truck 10 is shown, it is contemplated for the present invention to be connected to any vehicle having a pivoting tailgate 9 that can be moved between a substantially vertically-extending closed position and a substantially horizontally-extending open position. Hereinafter, any statement about the present invention relating to use in a pick-up truck 10 should also be considered applicable to other vehicles (not shown) with pivoting tailgates 9, unless otherwise specifically mentioned. Both panels 1 and 2 have a planar upper surface and are placed into a substantially horizontally-extending orientation when tailgate 9 and distal tapered panel 1 are in their fully opened positions. Proximal panel 2 is directly connected to tailgate 9, substantially covers tailgate 9, and moves in unison with tailgate 9. In contrast, distal tapered panel 1 rotates relative to tailgate 9 and proximal panel 2 into multiple usable positions, and in many applications extends beyond the top/distal end of tailgate 9 when pivoting tailgate 9 and distal tapered panel 1 are both in their fully opened and horizontally-extending positions. An example of when distal tapered panel 1 in its position of use does not extend beyond tailgate 9 is shown in FIG. 8, where the present invention is rotated 180 degrees to serve as a bench seat. Although not shown in FIG. 1, it is also contemplated for the present invention to have more than one proximal panel 2 positioned between tapered distal panel 1 and tailgate 9. In addition, the size, perimeter configuration, and thickness dimension of panels 1 and 2 may vary from that shown in FIG. 1, although distal tapered panel 1 will always have a tapered configuration to benefit from the strength of the triangular formation provided, even though the amount of tapering may be more or less than that shown in FIGS. 1-7. Also, although a full size version of the present invention self-supporting table/extension is shown in FIG. 1, it is also contemplated for smaller embodiments to be made that, while not be able to support four hundred pound loads, could be useful at a reduced cost as a smaller self-supporting tailgate party refreshment serving surface or table. FIG. 1 further shows the present invention mounted on tailgate 9 with six fasteners 14 which can be stainless steel screws, well nut fasteners, machine screws, and the like. Further, although six fasteners 14 are shown in FIG. 1 and preferred, the use of six fasteners 14 is not critical. Instead, the number, material composition, configuration, dimension, and positioning of the fasteners 14 or other fastening means used to secure proximal panel or panels 2 to tailgate 9 are determined by the resulting ability of a specially configured portion 17 (shown in FIG. 4) of the distal tapered panel 1 pivotally connected to panel/panels 2 to engage the top/distal end of tailgate 9 in a position that allows distal tapered panel 1 to support the heaviest load (not shown) contemplated for it during intended applications of the associated truck 10 without additional leg support or any type of additional bracing under it. Whether the heaviest contemplated weight is the four hundred pounds successfully supported by the present invention to date in testing, or a different weight greater or lesser than four hundred pounds, is not critical. The distal tapered panel 1 and the proximal panel 2 in FIG. 1 are shown joined by a continuous hinging means 3, which can be either mounted or molded, that allows the table formed by tapered distal panel 1 to be rotatable into a full 180 degree range relative to proximal panel 2. The cutout configurations 16 (shown in FIG. 4) in both panels 1 and 2 are dimensioned to accommodate the rotating motion allowed by hinging means 3 and maintain the needed strength of the upper surface of distal tapered panel 1. Thus, tapered distal panel 1 not only extends the usable surface area of tailgate 9 but allows it to serve as a completely self-supported table (without additional legs or bracing) for recreational purposes. As can be further seen in FIG. 1, two tailgate cables 12 are provided by the manufacturer of truck 10 and extend between the sides of tailgate 9 and the remainder of truck 10 to prevent the fully opened position of tailgate 9 from exceeding a substantially 90 degree rotation from its vertically-extending closed position. To open the tailgate table/extension of the present invention shown in FIG. 1, one must place tailgate 9 into its fully opened and horizontally-extending position, which also places the proximal panel 2 into the same horizontally-extending orientation since it is directly attached to the top surface of tailgate 9, and then one must rotate distal tapered panel 1 substantially 180 degrees from tailgate 9 and proximal panel 2 in a direction away from the back end of truck 10. A bracketed configuration 17 (shown in FIG. 4) on the underside surface of tapered distal panel 1 will then engage the top/distal end of tailgate 9 and prevent further rotation of panel 1, and thereby allow it to support a heavy load without any ground support needed between it and the parking lot, roadway, or other surface below truck 10. FIG. 1 further shows several optional cup holders 4 being provided in the horizontally-extending top surface of tapered distal panel 1. In addition to, or in the alternative, distal tapered panel 1 may also have an opening 5 configured to fit a standard outdoor umbrella (not shown). The number, configuration, dimension, and positioning of cup holders 4, umbrella openings 5, and/or other optional tailgate party enhancing accessory attachment or support means are not critical and may be different from that shown in FIG. 1. It is preferred that all materials used for the present invention be rust resistant, waterproof, and UV resistant as needed so that its useful life is not prematurely shortened.

Figure 2:
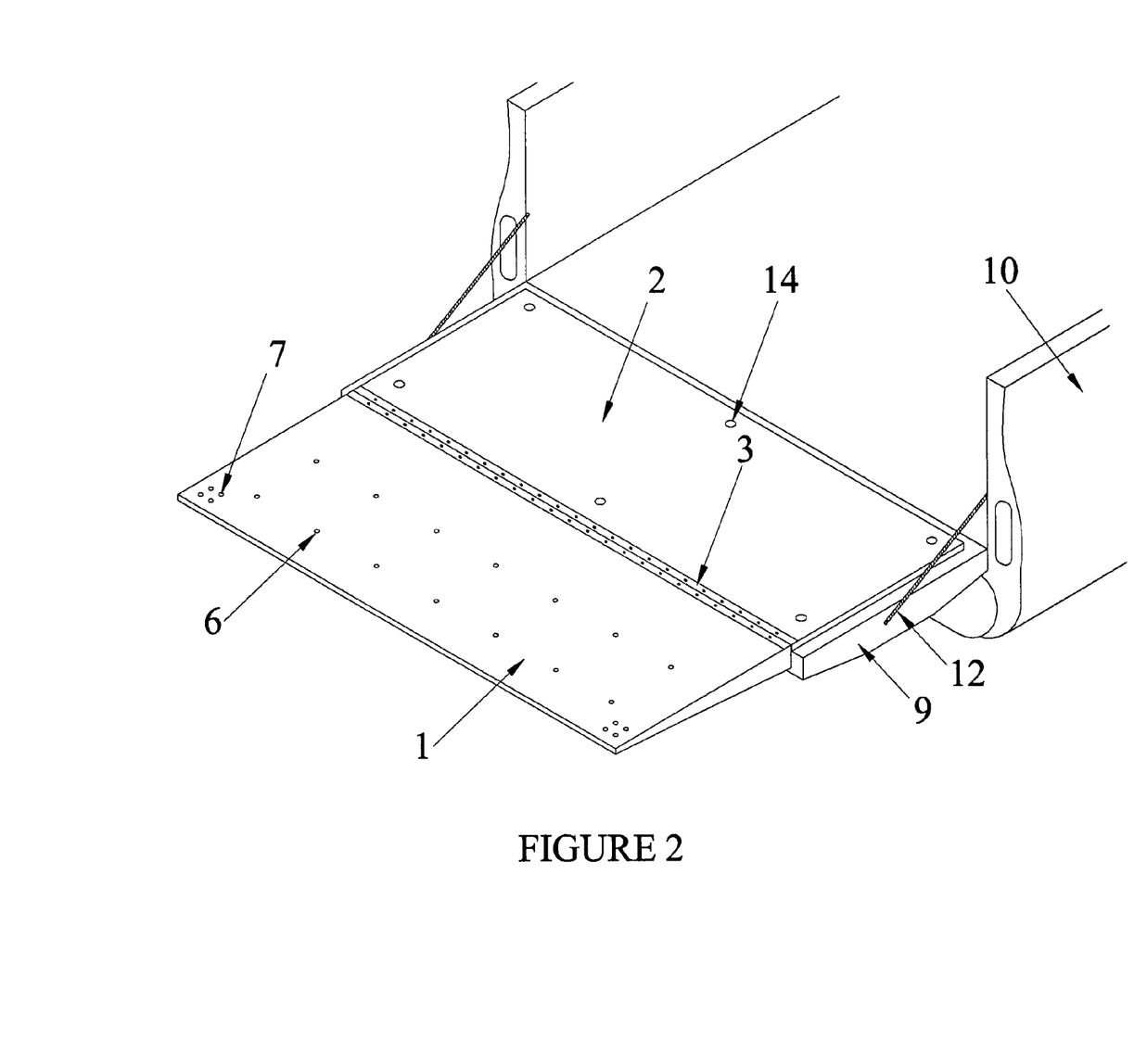
FIG. 2 is a top plan view of a second preferred embodiment of the present invention used in workbench applications.

FIG. 2 illustrates a second preferred embodiment of the present invention, a work related embodiment for on-the-job applications. Of particular interest are pre-drilled hole clusters 7 configured for the purpose of fitting a vice (not shown) onto a corner of self supporting distal tapered panel 1. Although not shown, pre-drilled hole clusters 7 may have other positioning on tapered distal panel 1 or proximal panel 2. FIG. 2 also shows distal tapered panel 1 having multiple pre-drilled holes 6 configured for the purpose of inserting bench dogs (not shown) or other supportive devices configured to hold materials securely while working on or with them. The configuration, size, number, and location of pre-drilled holes 6 and hole clusters 7 may vary from that shown in FIG. 2, and are not critical as long as they allow distal tapered panel 1 to fulfill its intended support function. As in FIG. 1, FIG. 2 shows the two tailgate cables 12 provided by the manufacturer of truck 10 that extend between the sides of tailgate 9 and the remainder of truck 10 and prevent the fully opened position of tailgate 9 from exceeding a substantially 90 degree rotation from its vertically-extending closed position.

Figure 3:
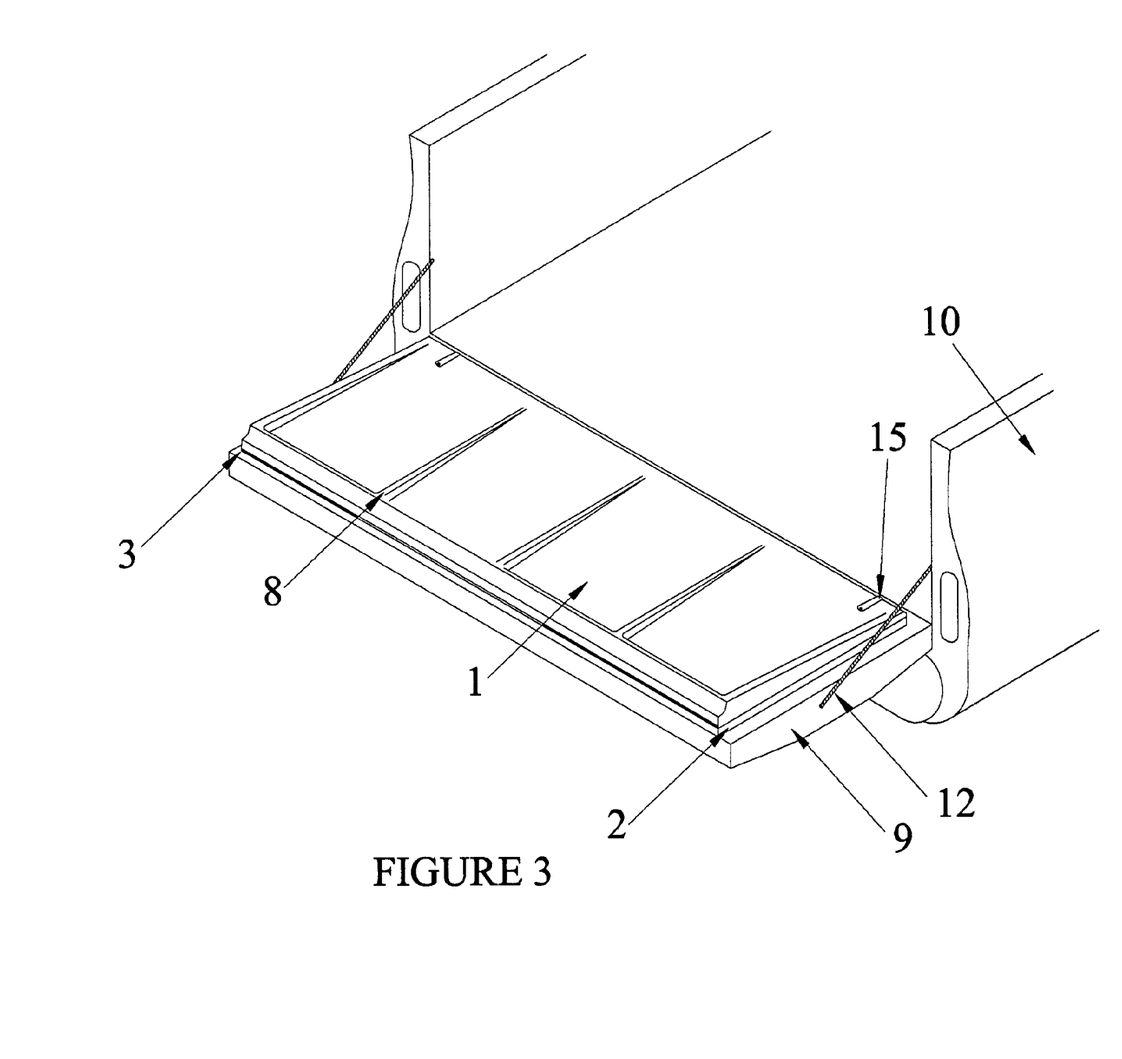
FIG. 3 is a top plan view of the first or second preferred embodiments of the present invention in a closed position on the tailgate of a truck.

In FIG. 3 one can see the self-supporting tailgate table or workbench of the first or second embodiment of the present invention having its distal tapered panel 1 and proximal panel 2 both in their compactly stowed positions against the open tailgate 9 of truck 10 wherein panels 1 and 2 compromise little space in bed of pickup truck 10 or other vehicle with a pivoting tailgate 9 to which the present invention is attached. FIG. 3 further shows the bottom surface of distal tapered panel 1 having engineered stiffeners 8 configured for the purpose of creating a distal tapered panel 1 capable of supporting weight bearing loads (not shown). Although the size, number, configuration, and positioning of engineered stiffeners 8 shown in FIG. 3 are preferred, other arrangements are also considered to be within the scope of the present invention. FIG. 3 further shows two simple snap attachments 15 that are laterally fixed across the non-hinged ends of distal tapered panel 1 and proximal panel 2, to keep panels 1 and 2 secure while in a stowed position. The number, type, size, and positioning of attachments 15 used to maintain panels 1 and 2 in their stowed configurations is not critical, as long as they fulfill their intended function, and it is also contemplated for the present invention to also include other types of fasteners (not shown) for the same purpose, although fasteners that are simple in structure and configuration are most preferred. FIG. 3 also shows the hinge 3 pivotally joining distal tapered panel 1 and proximal panel 2, and the two tailgate cables 12 that extend between the sides of tailgate 9 and the remainder of truck 10.

Figure 4:
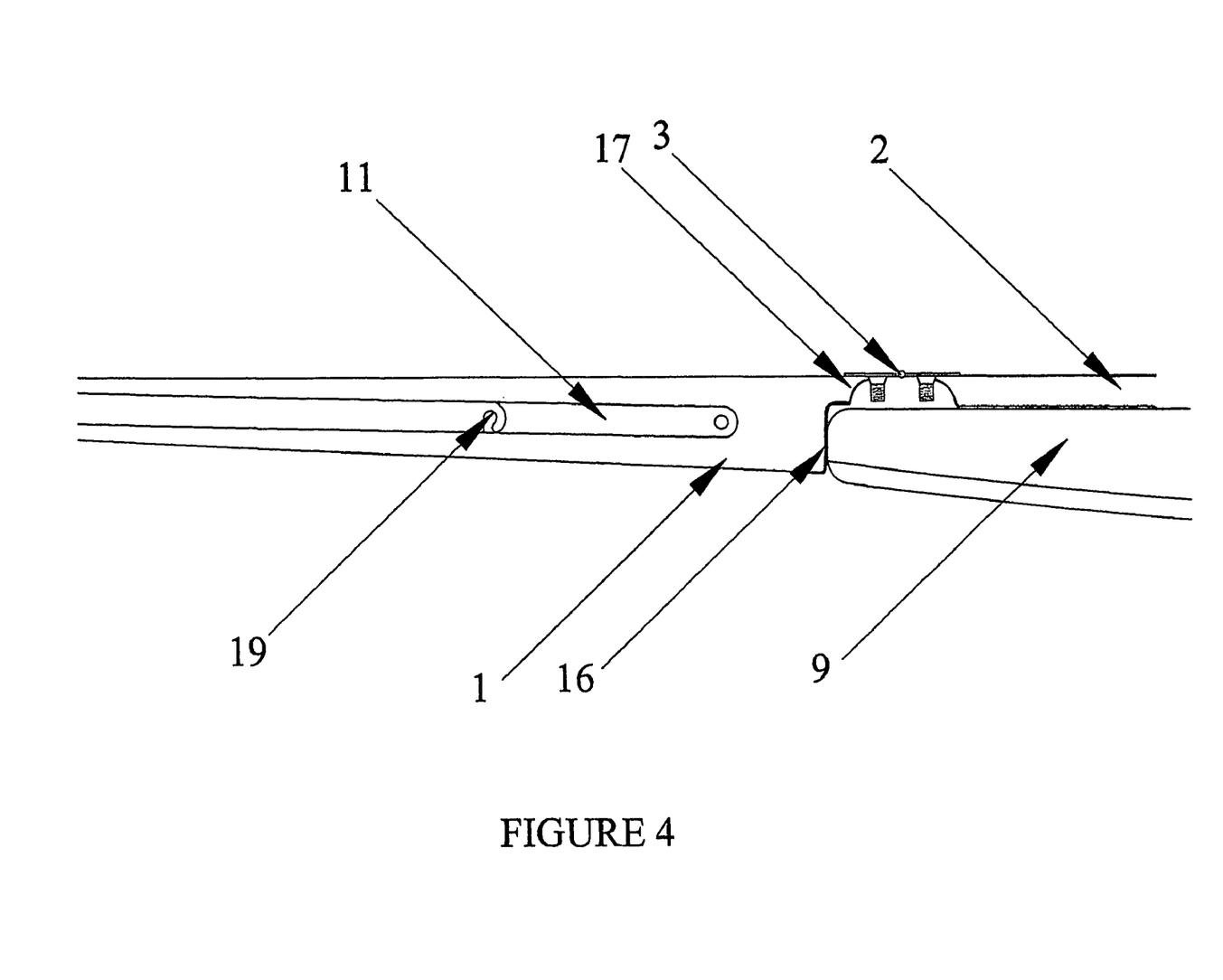
FIG. 4 is an enlarged sectional view of the self-supporting mechanism used in the first and second preferred embodiments of the present invention engaging the top/distal end of the tailgate of a truck.

FIGS. 4-8 show a third preferred embodiment of the present invention with multiple uses and having a bi-fold bracket 11 that is employed to fix distal tapered panel 1 in various positions for such uses. FIG. 4 is an enlarged view of the bracketed configuration 17 of the present invention self-supporting table/extension which shows the part of distal tapered panel 1 connected to hinging means 3 overlaying tailgate 9. It is evident from FIG. 4 that the distal tapered panel 1 is configured and dimensioned to hold supported weight (not shown) without any other means, including braces, legs, or other support devices (not shown) between distal tapered panel 1 and the parking lot, roadway, or other surface supporting the truck 10 to which it is attached. The structure of bracketed configuration 17 is critical and cannot be substantially varied from that shown in FIG. 4 or distal tapered panel 1 will not be self-supporting under a heavy load of four hundred pounds or more. The joining of both panels 1 and 2 by an off-set hinging means 3 that creates a right angle strength-enhancing support configuration is also more clearly shown in FIG. 4, which illustrates a preferred cutout configuration 16 in both panels 1 and 2, that are dimensioned to accommodate the rotating motion allowed by hinging means 3 and also to maintain the needed strength of the upper surface of distal tapered panel 1 for supporting weight bearing loads. As can be see in FIG. 4, during use of the present invention hinging means 3 remains positioned over the top/end of tailgate 9 and does not extend beyond thereof. Further, in FIG. 4 one can easily see the bi-fold bracket 11 in its stowed position against the side of distal tapered panel 1 which is used in the third embodiment of the present invention to fix distal tapered panel 1 into its various positions of use (see FIGS. 5 and 8). The free end of bi-fold bracket 11 is shown in FIG. 4 to have a hooked configuration 19 for fast, easy, and secure attachment to a locking pin (not shown) fastened to truck 10.

Figure 5:
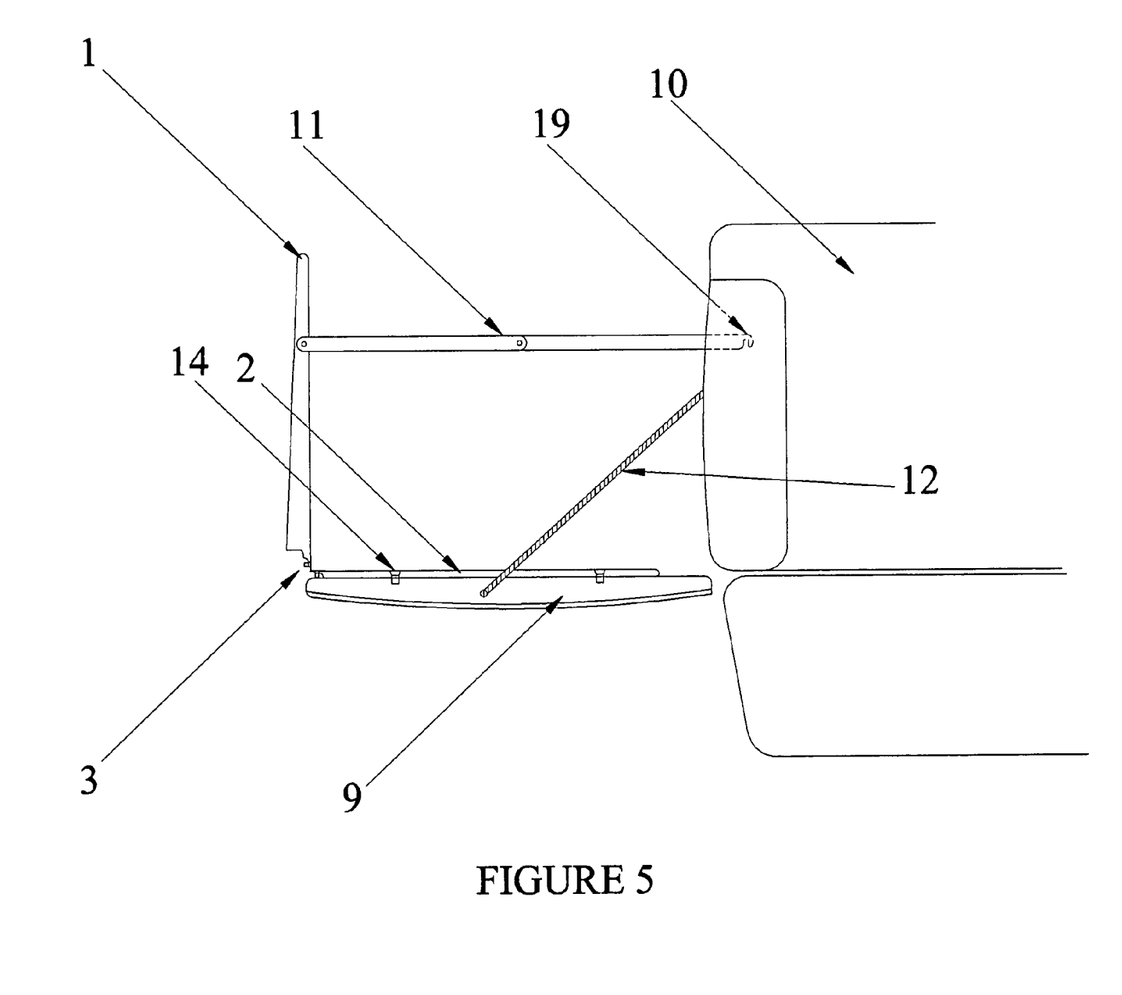
FIG. 5 is a side view of a third preferred embodiment of the present invention locked in an approximate 90 degree angle and having a bi-fold bracket engaged and locked between the distal tapered panel and the truck.

The preferred embodiment in FIG. 5 shows the distal tapered panel 1 of the present invention in a locked position at approximately 90 degrees relative to the horizontally-extending open tailgate 9 and the also horizontally-extending proximal panel 2 attached to the upper surface of tailgate 9 via fasteners 14. In the vertically-extending position shown, distal tapered panel 1 functions as a tailgate, in place of tailgate 9, while the combined tailgate 9 and proximal panel 2 together function to extend the bed of truck 10 an approximate distance of eighteen inches. The use of a bi-fold bracket 11, or locking device of another configuration fulfilling the same function, keeps the rigid distal tapered panel 1 in a locked position for the purpose of extending the hauling capacity of any vehicle having a pivoting tailgate 9 to which the present invention is attached, such as but not limited to a pickup truck 10. Although not limited thereto, the preferred extension amount is an approximate distance of eighteen inches. Thus, when tailgate 9 is in an open and substantially horizontally-extending position and functions as a bed extension of the truck 10 or other vehicle to which it is attached, distal tapered panel 1 replaces the original tailgate 9 to mimic its function and safety. The bracket 11 is preferably attached to the outer opposite edges of distal tapered panel 1 and also preferably reaches to the inside of the bed of pickup truck 10, locking onto an existing lock pin secured to truck 10. Since the locking pin is not readily visible in FIG. 5, it has not been given a number. However, any pin or other device that allows the free end of bi-fold bracket 11 to be readily secured, and quickly and easily released, can also be used.

Figure 6:
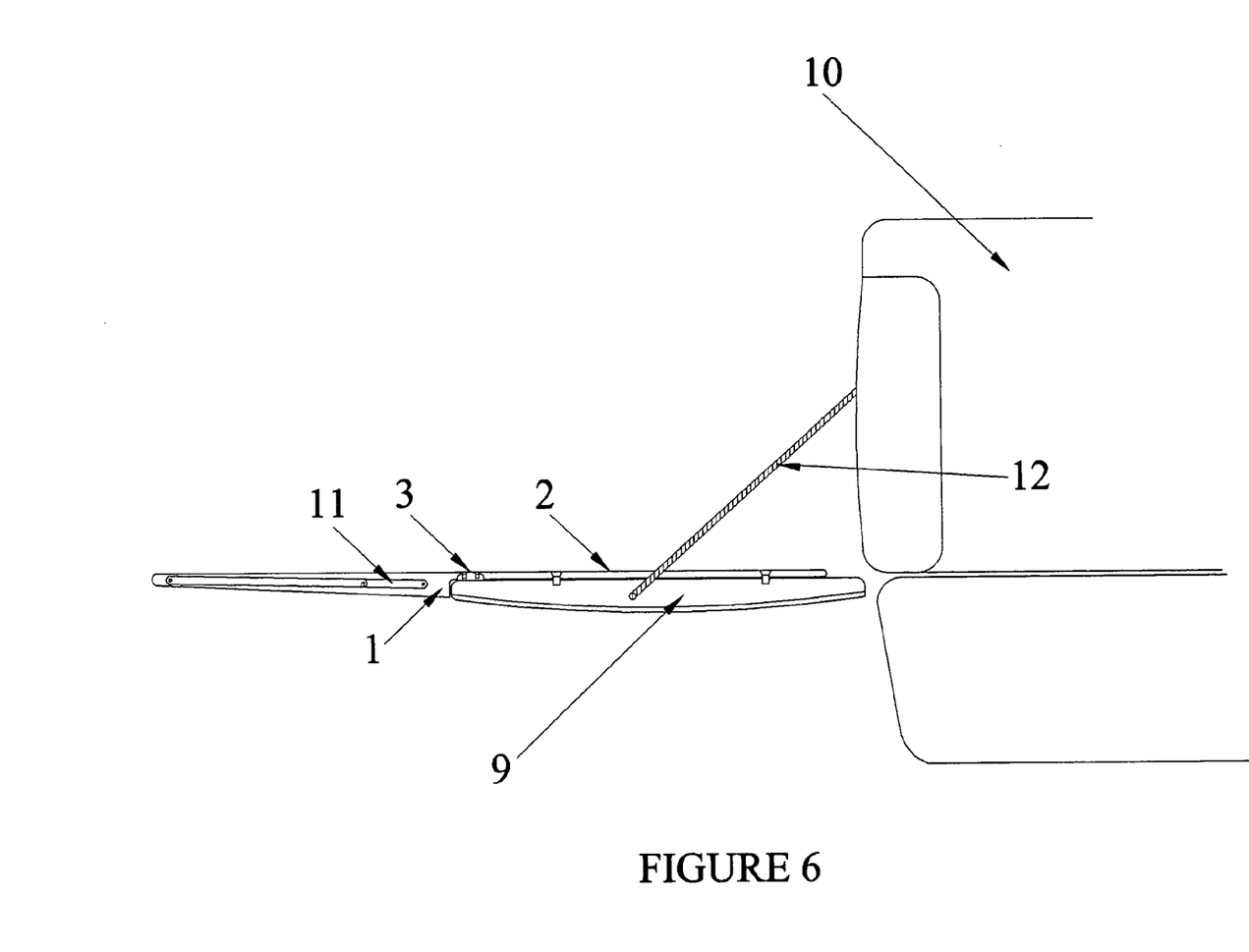
FIG. 6 is a side view of the third preferred embodiment of the present invention used as a self-supporting tailgate table with its bi-fold bracket secured in an out-of-the-way-position.

FIG. 6 shows the profile of the third preferred embodiment of the present invention. It is very easily attached to any tailgate 9 by a small number of threaded fasteners 14, and can also be removed with little effort. It is comprised of a limited number of moving parts for reduced cost and ease of use, including distal tapered panel 1, continuous hinging means 3, and bi-fold bracket 11. If the present invention is optionally used with newer models of pick-up trucks 10, installation of the present invention requires little or no adaptation to the trucks' tailgates 9, as newer model pickup trucks have holes (not shown) already pre-drilled into their tailgates 9. In contrast, the installation of the present invention into older models of pick-up trucks would require the pre-drilling of holes into their tailgates 9 to secure needed fasteners 14. When the panels 1 and 2 of the present invention are rotated and secured in a compact stowed position adjacent to a tailgate that has been returned to its closed position, it now becomes apparent to those skilled in the art that the present invention boasts a compactness that will compromise little space in the truck bed itself is not duplicated in the prior art. FIG. 6 also shows bi-fold bracket 11 secured to the side of distal tapered panel 1, hinging means positioned over the top/end of tailgate 9, and tailgate cable 12 extending between the side of tailgate 9 and the remainder of truck 10.

Figure 7:
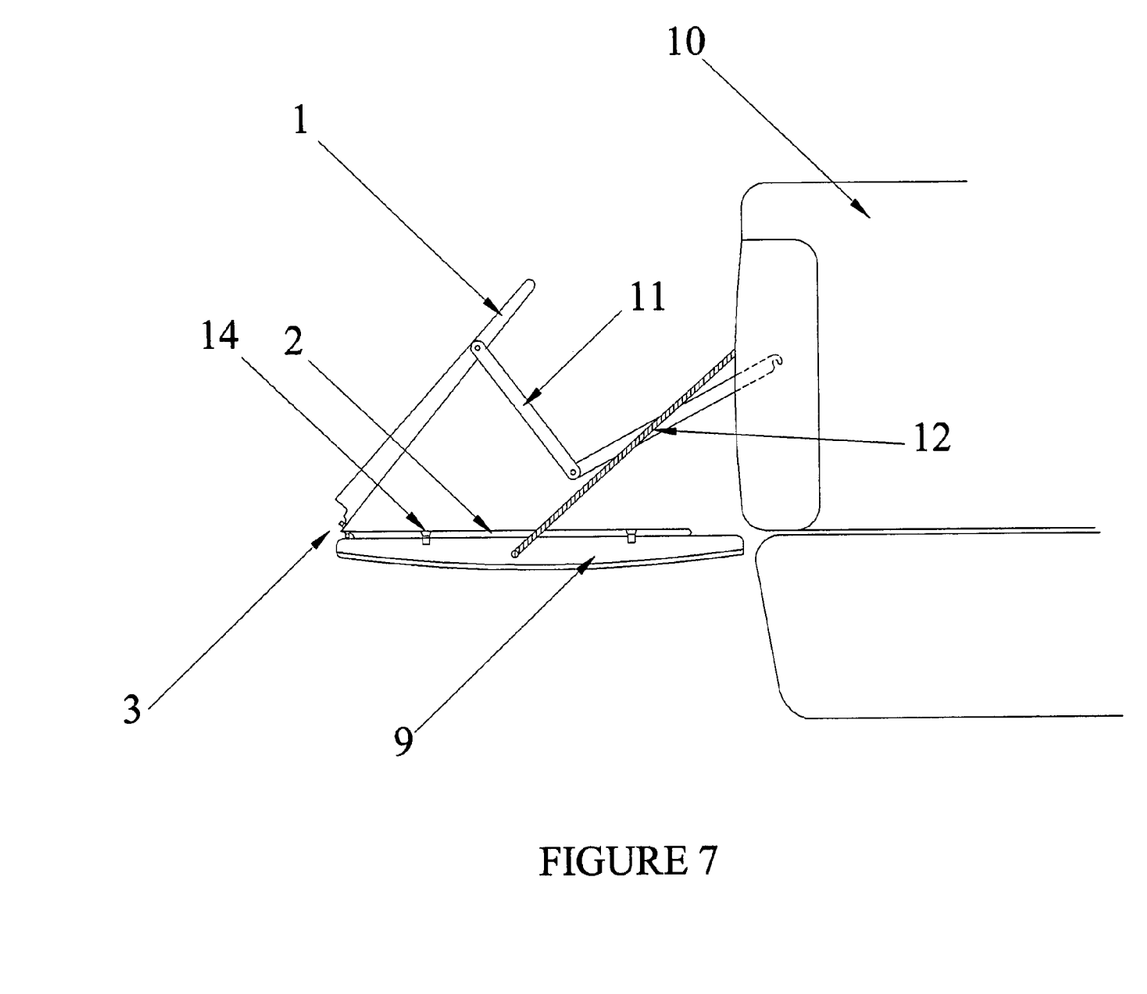
FIG. 7 is a side view of the third preferred embodiment of the present invention rotating between its open and closed/storage positions.

In contrast, FIG. 7 shows the third preferred embodiment in a partially collapsed configuration after use as a replacement for tailgate 9, as in FIG. 5 above. FIG. 7 shows distal tapered panel 1 and bi-fold bracket 11 both rotating relative to one another. The hooked configuration 19 (shown in FIGS. 4 and 5) of the free end of bi-fold bracket 11 is shown still attached to the truck 10 to the locking pin or other fastening/locking device mentioned above in the description of FIG. 5. However, before the present invention can be placed into its stowed configuration, the hooked configuration 19 on the free end of bi-fold bracket 11 will have to be released from its connecting point on truck 10 and secured in an out-of-the-way closed position against the side of distal tapered panel 1 until further needed. FIG. 7 further shows distal tapered panel 1 connected to proximal panel 2 via hinging means 2, hinging means 3 located near to the top/end of tailgate 9, and proximal panel 2 secured to tailgate 9 fasteners 14.

Finally FIG. 8 shows the third preferred embodiment of the present invention rotated 180 degrees relative to the tailgate and now serving as a bench seat at the rear of truck 10. Proximal panel 2 is still attached to the top surface of tailgate 9 via fasteners 14, however, hinging means 3 is now positioned remotely from the top/end of tailgate 9. The top end of distal tapered panel 1 is now secured in its usable position as a back support for the bench seat configuration, via bi-fold bracket 11 the other end of which is releasably secured to a locking pin or other device attached to truck 10 (not shown). Tailgate cables 12 provided by the manufacturer of truck 10 still are needed between the sides of tailgate 9 and the remainder of truck 10 to prevent the fully opened position of tailgate 9 from exceeding a substantially 90 degree rotation from its vertically-extending closed position. However, for clarity of illustration in FIG. 8, the near tailgate cable 12 has been omitted from the illustration.

I claim:

1. A supportive device for attachment to the tailgate of motor vehicles, including pick-up trucks having a tailgate being rotatable between open and closed positions, with the tailgate having a top surface and a vertically-extending rear edge in its open position, wherein said supportive device provides enhanced utility of the tailgate when in the open position for recreational and work-related applications, said supportive device comprising:

at least one proximal panel having a planar upper surface;

a distal panel having a planar upper surface, a distal end, and an opposed proximal end, with said proximal end having a bracing configuration shaped for overlaying a portion of the tailgate top surface;

hinging means adapted for pivotally connecting said at least one proximal panel and said distal panel so that said distal panel is capable of moving relative to said at least one proximal panel from a compact storage position to at least one opened position, said hinging means located in a position above the tailgate top surface a spaced-apart distance from the vertically-extending rear edge of the tailgate that in combination with said bracing configuration creates the sheer load against said hinging means and the tailgate needed to allow self-supporting use of distal panel under heavy load; and fastening means adapted for attaching said at least one proximal panel to the top surface of the tailgate whereby when said at least one proximal panel is attached to the top surface of the tailgate, said planar upper surface of said distal panel provides a weight-bearing extension for the open tailgate without the use of any additional mechanical support connected to said distal panel.

2. The device according to claim 1 wherein said at least one proximal panel comprises a single proximal panel connected to the tailgate, wherein said fastening means comprises a plurality of threaded fasteners and further wherein said at least one proximal panel has a plurality of fastener holes complementary to said threaded fasteners.

3. The device according to claim 1 wherein said hinging means is selected from a group consisting of piano hinges, flat hinges, and strap hinges.

4. The device according to claim 3 wherein said piano hinges, said flat hinges, and said strap hinges are further selected from a group consisting of mounted hinged and molded hinges.

5. The device according to claim 1 wherein said panels are configured, dimensioned, and connected together to provide a rigid work surface that can be positioned to extend at least eighteen inches beyond the rear edge of the tailgate when it is in the open position.

6. The device according to claim 1 wherein said distal panel has a bottom surface and said bottom surface has at least one engineered stiffener.

7. The device according to claim 3 wherein said panels are constructed of materials selected from a group consisting of rust resistant materials, waterproof materials, and UV resistant materials.

8. The device according to claim 1 further comprising snap fastening means adapted for locking said distal panel to said at least one proximal panel when said panels are adjacent to one another in said compact storage position against the motor vehicle tailgate.

9. The device according to claim 1 wherein said fastening means for attaching said at least one proximal panel to the tailgate is selected from a group consisting of stainless steel screws, well nut fasteners, and machine screws.

10. The device according to claim 1 wherein said at least one proximal panel is easily removable from the tailgate.

11. The device according to claim 1 wherein said distal panel and said at least one proximal panel are configured, dimensioned, and connected to one another in such a way as to require a minimum of space adjacent to the tailgate when placed into said compact stowed position.

12. The device according to claim 1 wherein said distal panel is configured and dimensioned to hold at least 400 lbs. of supported weight.

* * * * *